US006973534B2

(12) United States Patent
Dawson et al.

(10) Patent No.: US 6,973,534 B2
(45) Date of Patent: Dec. 6, 2005

(54) APPARATUS AND METHOD TO EXPORT AND THEN IMPORT A LOGICAL VOLUME WITH ASSIGNED STORAGE ATTRIBUTES

(75) Inventors: Erika M. Dawson, Tucson, AZ (US);
Kevin L. Gibble, Tucson, AZ (US);
Jonathan W. Peake, Tucson, AZ (US);
Linda J. Schiltz, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 10/230,501

(22) Filed: Aug. 29, 2002

(65) Prior Publication Data

US 2004/0044851 A1 Mar. 4, 2004

(51) Int. Cl.[7] .............................................. G06F 12/00
(52) U.S. Cl. ...................... 711/112; 711/114; 707/10; 707/205
(58) Field of Search .................... 711/111, 112, 114; 707/10, 205

(56) References Cited

U.S. PATENT DOCUMENTS

| | | | |
|---|---|---|---|
| 4,755,928 A | | 7/1988 | Johnson et al. ............. 364/200 |
| 5,870,732 A | * | 2/1999 | Fisher et al. ................... 707/1 |
| 5,897,661 A | * | 4/1999 | Baranovsky et al. ........ 711/170 |
| 5,983,316 A | * | 11/1999 | Norwood .................... 711/112 |
| 6,202,124 B1 | | 3/2001 | Kern et al. ................. 711/112 |
| 6,247,103 B1 | | 6/2001 | Kern et al. ................. 711/162 |
| 6,336,163 B1 | * | 1/2002 | Brewer et al. .............. 711/112 |
| 6,718,427 B1 | * | 4/2004 | Carlson et al. ................. 711/5 |
| 6,728,831 B1 | * | 4/2004 | Bridge ........................ 711/112 |

OTHER PUBLICATIONS

Erner, et al., "A Model of File Server Performance for a Heterogeneous . . . ", 1986, pp. 338–347.
Menon, "A Performance Comparison of RAID–5 and Log–Structured Arrays", 1995, pp. 167–178.
Savage, "Storage Server as Physical Box", 1988, pp. 14–20.

* cited by examiner

*Primary Examiner*—Nasser Moazzami
*Assistant Examiner*—Ngoc V Dinh
(74) *Attorney, Agent, or Firm*—Dale F. Regelman (57) ABSTRACT

A method to export and then import a logical volume with assigned storage attributes, from a first information storage medium to a second information storage medium. The method maintains a logical volume in a first information storage medium. The method assigns one or more first storage attributes to that logical volume. The method further includes forming an import list logical volume. The method further includes defining a plurality second storage attributes. The method further includes importing the logical volume, and the assigned first storage attributes, into a second information storage medium. The method then determines if the import list logical volume specifies use of one or more second storage attributes. If the import list logical volume specifies use of one or more second storage attributes, then the method assigns to the logical volume those one or more second storage attributes.

28 Claims, 7 Drawing Sheets

APPARATUS AND METHOD TO EXPORT AND THEN IMPORT A LOGICAL VOLUME WITH ASSIGNED STORAGE ATTRIBUTES

FIELD OF THE INVENTION

Applicant's invention relates to an apparatus and method to export a logical volume with assigned storage attributes from a first information storage medium and to import that logical volume into a second information storage medium. In certain embodiments, the first information storage medium is disposed in a first virtual tape system and the second information storage medium is disposed in a second information storage medium.

BACKGROUND OF THE INVENTION

In hierarchical computer storage systems, intensively used and fast storage are paired with arrays of slower and less frequently accessed data devices. One example of high-speed, expensive memory is a direct access storage device file buffer (DASD). Slower storage devices include tape drives and disk drive arrays, which are less expensive than a DASD.

One such hierarchical storage system is a virtual tape storage system. Such a virtual tape storage system may include, for example, one or more virtual tape servers ("VTS") in combination with one or more data storage and retrieval systems, such as the IBM TotalStorage® 3494 Enterprise Tape Library. During operation, the virtual tape storage system is writing data from a host to the numerous data storage devices disposed in the one or more data storage and retrieval systems.

Automated data storage and retrieval systems are known for providing cost effective access to large quantities of stored media. Generally, a data storage and retrieval system includes a large number of storage slots on which are stored portable data storage media. The typical portable data storage media is a tape cartridge, an optical cartridge, a disk cartridge, electronic storage media, and the like. By electronic storage media, Applicants mean a device such as a PROM, EPROM, EEPROM, Flash PROM, and the like.

One (or more) accessors typically accesses the data storage media from the storage slots and delivers the accessed media to a data storage device for reading and/or writing data on the accessed media. Suitable electronics operate the accessor(s) and operate the data storage device(s) to provide information to, and/or to receive information from, an attached on-line host computer system.

SUMMARY OF THE INVENTION

Applicants' invention includes a method and apparatus to export, from a first information storage medium to a second information storage medium, a logical volume and storage attributes assigned to that logical volume. Applicants' method maintains a logical volume in a first information storage medium. In certain embodiments, the first information storage medium is disposed in a first virtual tape system in communication with a first host computer. Applicants' method assigns one or more first storage attributes to the logical volume. In certain embodiments, the first host computer assigns those first storage attributes. Applicants' method further includes forming an export list logical volume which indicates which logical volumes to export.

Applicants' method further includes defining a plurality second storage attributes. In certain embodiments, a second host computer defines these second storage attributes. In certain embodiments, a second virtual tape system defines these second storage attributes. Applicants' method further includes importing the logical volume, and the assigned first storage attributes, into a second information storage medium. In certain embodiments, the second information storage medium is disposed in a second virtual tape system. Applicants' method then determines if the import list logical volume specifies use of one or more second storage attributes. If the import list logical volume specifies use of one or more second storage attributes, then Applicants' method selects those one or more of those second storage attributes. If the export physical volume includes one or more first storage attributes, then Applicants' method merges those first storage attributes with the specified second storage attributes. Applicants' method assigns the merged storage attributes to the logical volume, and saves those merged storage attributes for subsequent use.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in a virtual tape server in combination with an automated data storage and retrieval subsystem for use in a data processing environment. The following description of Applicant's apparatus and method is not meant, however, to limit Applicant's invention to either data storage and retrieval systems, or to data processing applications, as the invention herein can be applied to data storage in general.

Figure 3:
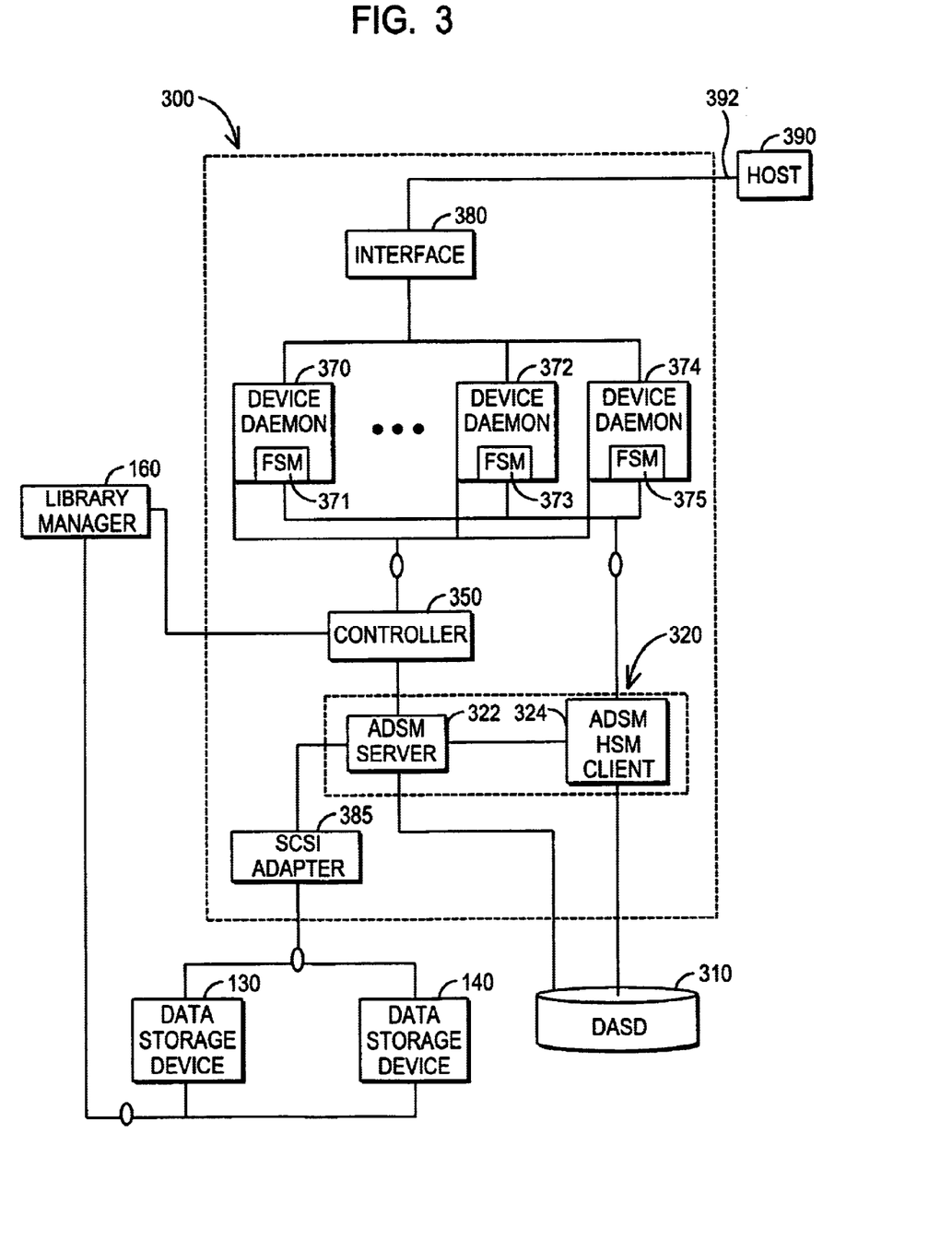
FIG. 3 is a block diagram showing the components of Applicants' virtual tape system.

FIG. 3 illustrates the hardware and software environment in which preferred embodiments of the present invention are implemented. Virtual tape server (VTS) 300 is pictured, operatively coupled to a host computer 390. In certain embodiments, host computer 390 comprises a single computer. In alternative embodiments, host computer 390 comprises one or more mainframe computers, one or more work stations, one or more personal computers, combinations thereof, and the like.

Host computer 390 communicates with VTS 300 via communication link 392 with a host-to-data interface 380 disposed within the virtual tape server 300. Communication link 392 comprises a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof. In certain embodiments, the host-to-data interface 380 comprises an IBM Enterprise Systems Connection (ESCON) and communication link 392 comprises a fiber optic local area network used to link mainframes to disk drives or other mainframes.

VTS 300 also communicates with direct access storage device (DASD) 310, a plurality of data storage devices 130/140 and library manager 160. Data storage devices 130 and 140, and library manager 160, are disposed within one or more data storage and retrieval systems, such as data storage and retrieval systems 100 (FIG. 1)/200 (FIG. 2). In certain embodiments, DASD 310 is integral with host 390. In certain embodiments, DASD 310 is integral with VTS 300. In certain embodiments, DASD 310 is integral with a data storage and retrieval system. In certain embodiments, DASD 310 is external to host 390, VTS 300, and the one or more data storage and retrieval systems in communication with VTS 300. In the embodiment of FIG. 3, library manager 160 communicates with data storage devices 130 and 140. In alternative embodiments, library manager 160 does not directly communicate with data storage devices 130/140.

VTS 300 further includes storage manager 320, such as the IBM Adstar® Distributed Storage Manager. Storage manager 320 controls the movement of data from DASD 310 to information storage media mounted in data storage devices 130 and 140. In certain embodiments, storage manager 320 includes an ADSM server 322 and an ADSM hierarchical storage manager client 324. Alternatively, server 322 and client 324 could each comprise an ADSM system. Information from DASD 310 is provided to data storage devices 130 and 140 via ADSM server 322 and SCSI adapter 385.

VTS 300 further includes autonomic controller 350. Autonomic controller 350 controls the operations of DASD 310 through the hierarchical storage manager (HSM) client 324, and the transfer of data between DASD 310 and data storage devices 130 and 140. Library manager 160 communicates with autonomic controller 350.

From the host computer 390 perspective, device daemons 370, 372, and 374 appear to comprise multiple data storage devices attached to the host-to-data interface 380. Information is communicated between DASD 310 and host 390 via storage manager 320 and one or more of device daemons 370, 372, and 374.

Host computer 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 includes a storage management program 394 (not shown in FIG. 3). The storage management program 394 in the host computer 390 may include the functionality of storage management type programs known in the art that manage the transfer of data to a data storage and retrieval system, such as the IBM DFSMS implemented in the IBM MVS operating system.

The IBM DFSMS software is described in "z/OS V1R3 DFSMS Introduction," IBM document no. SC26-7397-01, which document is incorporated herein by reference in its entirety. Storage management program 394 may include known storage management program functions, such as recall and migration. The storage management program 394 may be implemented within the operating system of the host computer 390 or as a separate, installed application program. Alternatively, storage management program 394 may include device drivers, backup software, and the like.

Figure 1:
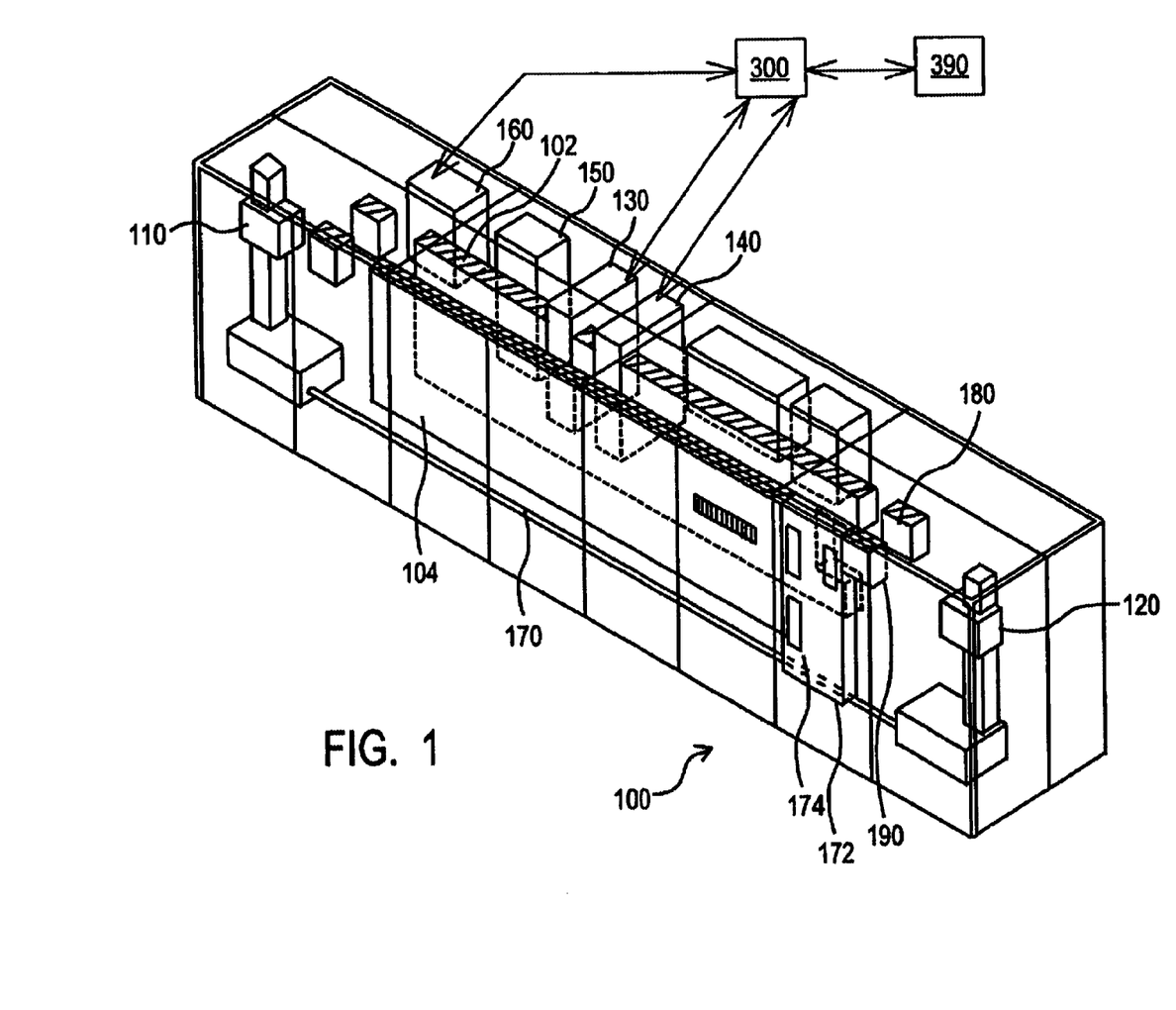
FIG. 1 is a perspective view of a first embodiment of Applicant's data storage and retrieval system.
Figure 2:
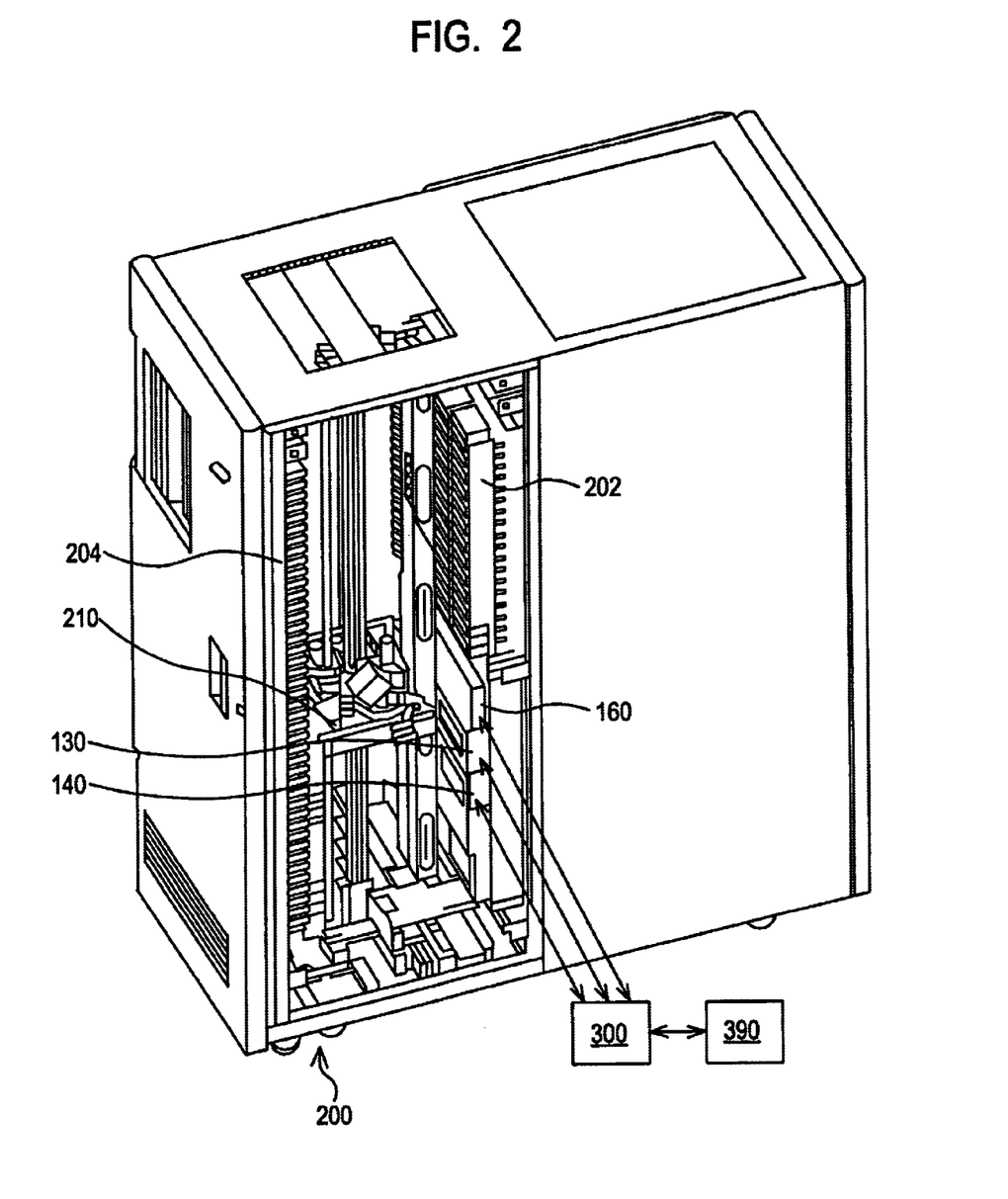
FIG. 2 is a perspective view of a second embodiment of Applicant's data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like.

Applicant's automated data storage and retrieval system includes one or more accessors, such as accessors 110 and 120. An accessor is a robotic device which accesses portable data storage media from first storage wall 102 or second storage wall 104, transports that accessed media to data storage devices 130/140 for reading and/or writing data thereon, and returns the media to a proper storage slot. In certain embodiments, data storage devices 130 (FIGS. 1, 2, 3) and 140 (FIGS. 1, 2, 3) comprise IBM TotalStorage® 3590 tape drives and the portable information storage media comprise magnetic tapes housed in IBM TotalStorage® 3590 tape cartridges.

Device 160 comprises a library manager. In certain of these embodiments, library controller 160 is integral with a computer. Operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage media. System 200 includes two or more data storage devices, such as devices 130 and 140. Data storage device 130/140 each comprise a floppy disk drive, an optical disk drive, a magnetic tape drive, an electronic media drive, and the like. System 200 further includes controller 160. System 200 further includes operator control panel 150 (not shown in FIG. 2).

System 200 further includes one or a plurality of portable data storage cartridges removeably disposed in one or more slots in storage walls 202/204. Each such cartridge contains a data storage medium internally disposed therein. Such data storage media includes optical media, magnetic media, tape media, electronic media, and combinations thereof.

System 200 also includes at least one robotic accessor 210 for transporting a designated portable data storage medium between a storage slot disposed in first wall 202 or second wall 204 and data storage device 130/140.

Figure 4:
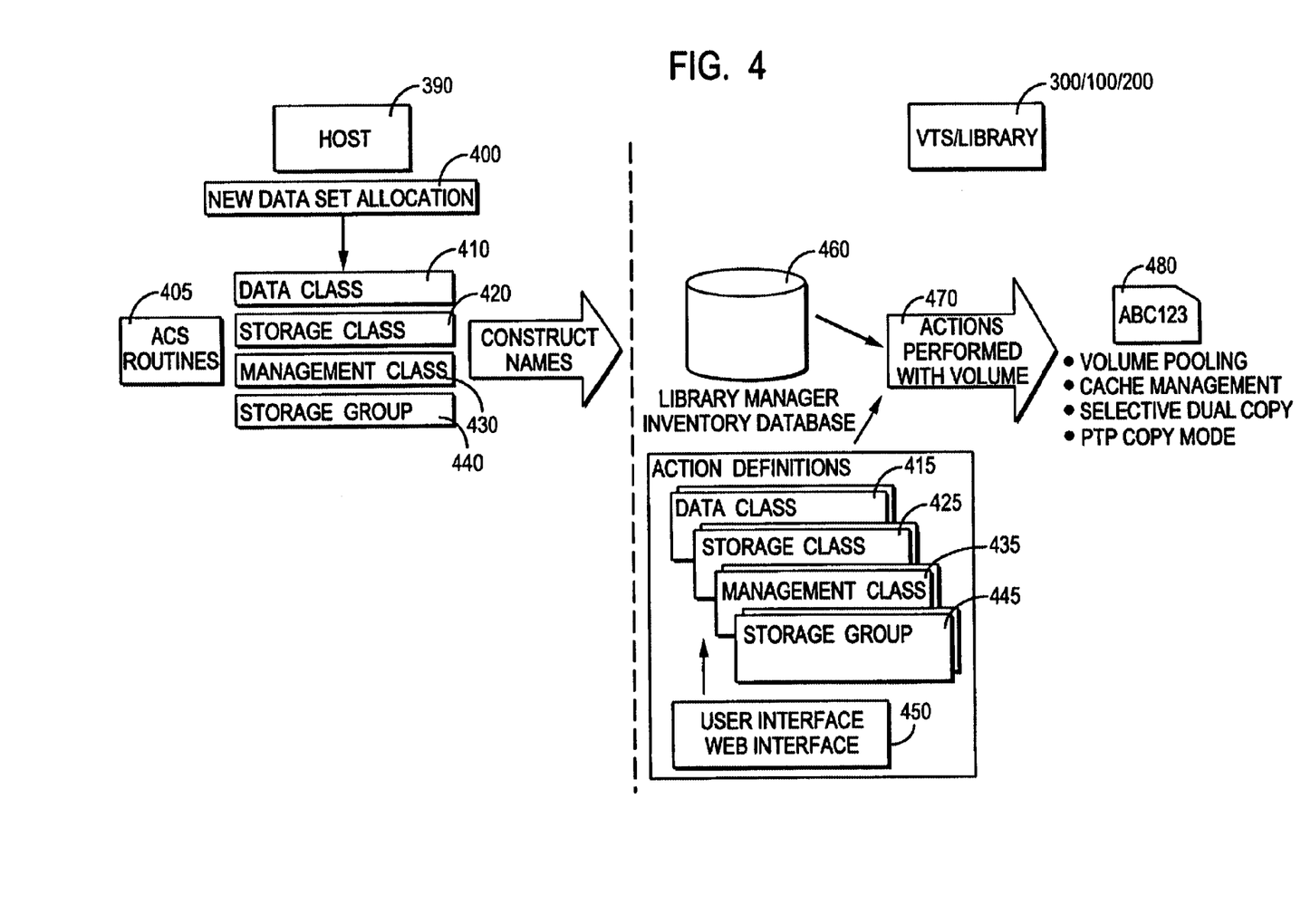
FIG. 4 is a block diagram showing passage of up to four storage construct names from a host computer to Applicants' virtual tape system.

FIG. 4 provides a graphical overview of Applicants' method to assign one or more storage construct names to a new dataset, and to provide the dataset and the one or more storage construct names to a virtual tape system. The virtual tape system writes the dataset to a logical volume, and uses the one or more storage construct names to assign one or more storage attributes to that logical volume.

For example, host computer 390 creates a new dataset 400. Host 390 includes a set of Automatic Class Selection ("ACS") routines which establish the data management policies for the new dataset, for one or more virtual volumes comprising that dataset, for writing those one or more virtual volumes to one or more physical volumes, and for management of those one or more volumes.

These ACS routine determine which information storage policies are assigned to each logical volume maintained by that host computer. These information policies include one or more data class policies 410, one or more storage class policies 420, one or more management class policies 430, and one or more storage group policies 440.

Data class storage policies include, for example, which recording format to use when writing volumes, which media cartridge to use, and the like. Storage class storage policies include, for example, whether to give the virtual volume preference to be removed or maintained on a DASD, such as DASD 310 (FIG. 3). Management class storage policies include, for example, whether a copy of the logical volume should be made immediately or whether to defer making that copy, selecting one or more information storage media to use when writing volumes, allocating a secondary stacked volume pool, and the like. Storage group storage policies include, for example, specifying a primary stacked volume pool for the logical volume, and the like.

After an ACS routine establishes a certain storage management policy for a logical volume, that ACS routine then assigns a storage construct name which indicates the selected storage management policy. In certain embodiments, each such storage construct name comprises an 8 byte designator.

In certain embodiments, host computer 390 comprises between zero and four ACS routines. In certain embodiments, host computer 390 comprises more and four ACS routines. In certain embodiments, host computer 390 comprises fewer than four ACS routines. In embodiments wherein host 390 includes four ACS routines, for example, host 390 may assign between zero and four storage construct names for new dataset 400. These zero to four storage construct names are passed by host 390 with new dataset 400 to an interconnected virtual tape system. Such an interconnected virtual tape system includes one or more virtual tape servers, such as VTS 300, and one or more data storage and retrieval systems, such as systems 100/200.

The virtual tape system includes a library manager, such a library manager 160 (FIGS. 1, 2). That library manager includes a library inventory 460. Library inventory 460 comprises a database. That inventory database 460 includes fields indicating the storage management policies selected for each virtual volume maintained on that virtual tape system. In certain embodiments, library database 460 includes a data class attribute field, a storage class attribute field, a management class attribute field, and a storage group attribute field.

Storage actions associated with each storage construct name are defined for a virtual tape system using an operator input station, such as operator input station 150 (FIG. 1), disposed in that virtual tape system. In certain embodiments, the operator input station is integral with the virtual tape server. In certain embodiments, the operator input station is integral with a data storage and retrieval system. In certain embodiments, the operator input station is remote from both the virtual tape server and the data storage and retrieval system. In these remote operator input station embodiments, operator input station 150 communicates with the virtual tape system using a serial interconnection, such as an RS-422 cable/RS-232 cable, a SCSI interconnection, an ethernet interconnection, a gigabit ethernet interconnection, a Fibre Channel interconnection, an ESCON interconnection, a local area network, a private wide area network, a public wide area network, a TCP/IP interconnection, combinations thereof, and the like.

When Applicants' virtual tape system writes a first file sequence, i.e. dataset 400, to a new logical volume the storage construct names assigned to the dataset are stored in library inventory 460 as storage attributes assigned to that logical volume. If the virtual tape system subsequently accesses that logical volume, those storage attributes are recalled and used to determine storage management policies for that logical volume and for physical volumes written for that logical volume.

Figure 5:
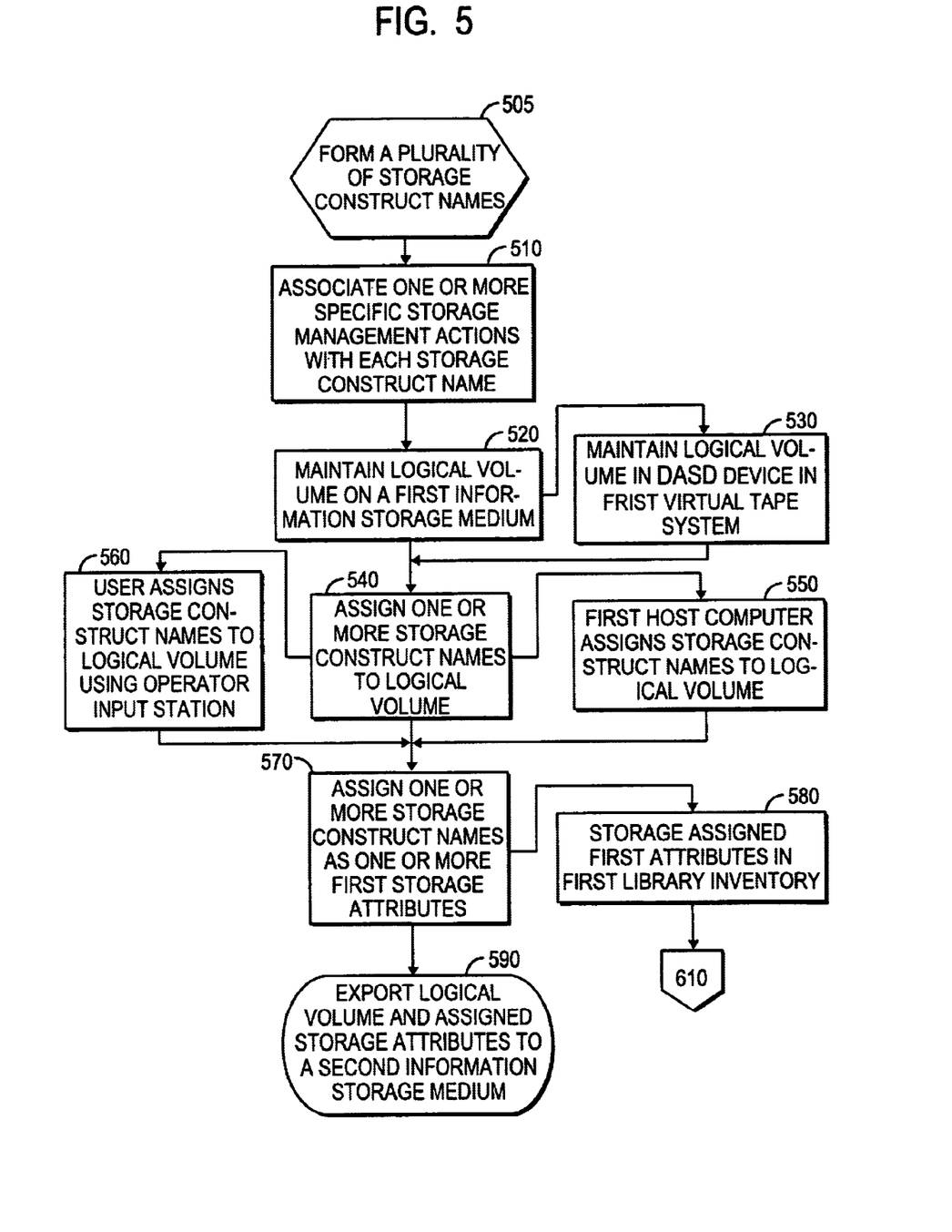
FIG. 5 is a flow chart summarizing the initial steps in Applicants' method.

FIG. 5 summarizes the initial steps in Applicants' method. Referring now to FIG. 5, in step 505 Applicants' method forms at a first time a plurality of storage construct names. In certain embodiments, each of these plurality of storage construct names comprises 8 bytes. In step 510, Applicants' method at a second time associates one or more specific storage management actions with each of the plurality of storage construct names.

In step 520, Applicants' maintains at a third time, where the third time is subsequent to the first time and the second time, a logical volume on a first information storage medium. In certain embodiments, step 520 further includes assigning an identifier to the logical volume. In certain embodiments this identifier comprises a volume serial number sometimes referred to as a volser.

In certain embodiments, Applicants' method includes step 530 wherein the logical volume is maintained in a DASD device, such as DASD 310 (FIG. 3), disposed in virtual tape system, where that virtual tape system is capable of communicating with one or more host computers, such as host computer 390 (FIGS. 1, 2, 3, 4).

In step 540, Applicants' method assigns one or more of the plurality of storage construct names of step 505 to the logical volume. In certain embodiments, Applicants' method includes step 550 wherein a host computer assigns the one or more storage construct names. In certain embodiments, the host computer assigns (N) storage construct names. In certain embodiments, (N) is zero. In alternative embodiments, (N) is selected from the group consisting of 1, 2, 3, and 4. In certain embodiments, (N) is greater than 4.

In certain embodiments, Applicants' method includes step 560 wherein a user assigns the one or more storage construct names using an operator input station, such as operator input station 150 (FIG. 1). In certain embodiments, the user assigns (N) storage construct names. In certain embodiments (N) is zero. In alternative embodiments (N) is selected from the group consisting of 1, 2, 3, and 4. In certain embodiments, the operator input station is integral with a virtual tape server. In certain embodiments, the operator input station is integral with a data storage and retrieval system in communication with a virtual tape server. In certain embodiments, the operator input station is remote from both the virtual tape server and the data storage and retrieval system. In these remote operator input station embodiments, operator input station 150 communicates with the virtual tape system using a serial interconnection, such as an RS-422 cable/RS-232 cable, a SCSI interconnection, an ethernet interconnection, a gigabit ethernet interconnection, a Fibre Channel interconnection, an ESCON interconnection, a local area network, a private wide area network, a public wide area network, a TCP/IP interconnection, combinations thereof, and the like.

In step 570, Applicants' method stores the logical volume's identifier, assigns the one or more storage construct names as one or more first storage attributes, and saves those first storage attributes. In certain embodiments, step 570 is performed by a virtual tape system which is capable of communicating with the one or more host computers of step 550. In certain embodiments, Applicants' method transitions from step 570 to step 590 wherein Applicants' method exports the logical volume of step 520, the logical volume's identifier of step 520, and the first storage attributes of step 570, to a second information storage medium.

In certain embodiments, Applicants' method transitions from step 570 to step 580 wherein the one or more first storage attributes of step 570 are stored in a library inventory disposed in the virtual tape system. In certain embodiments, the first virtual tape system includes a library manager, such as controller 160 (FIG. 1), where that controller includes a library inventory, such as library inventory 460 (FIG. 4). In these embodiments, the one or more assigned first storage attributes are saved in the first library inventory. Applicants' method transitions from step 580 to steps 610 through 690 (FIG. 6) wherein the logical volume, assigned identifier, and first storage attributes, are exported from the first virtual tape system, and imported into a second virtual tape system.

In certain embodiments, the first virtual tape system and the second virtual tape system are identical. In these embodiments, the logical volume and storage attributes are exported from the virtual tape system at a fourth time, and imported into that virtual tape system at a fifth time, where the fifth time is subsequent to the fourth time.

Figure 6:
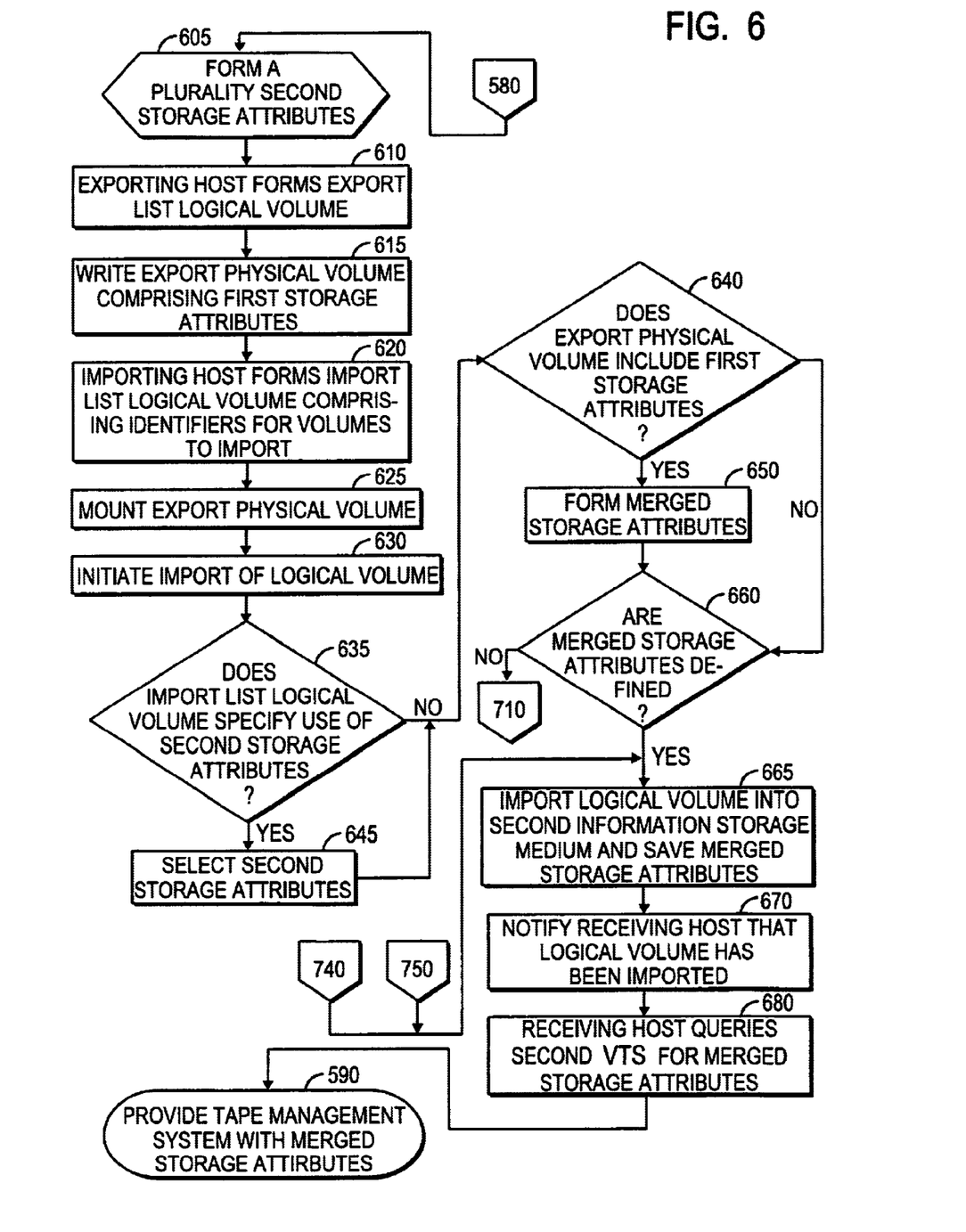
FIG. 6 is a flow chart summarizing additional steps in Applicants' method.

Referring now to FIG. 6, Applicants' method includes step 605 wherein Applicants' method defines a plurality of second storage attributes. In certain embodiments, an importing virtual tape system defines this plurality of second storage attributes. In certain embodiments, an importing host computer defines the second storage attributes.

In step 610 Applicants' method forms an export list logical volume. In certain embodiments, an exporting host computer forms the export list logical volume. In certain embodiments, file sequence one of the export list logical volume includes one or more logical volume identifiers, where those one or more logical volume identifiers indicate the logical volumes to export. In certain embodiments, these one or more logical volume identifiers comprise one or more volsers.

Example I is presented to further illustrate to persons skilled in the art how to make and use the invention and to identify certain embodiments thereof. This example is not intended as a limitation, however, upon the scope of the invention, which is defined only by the appended claims.

EXAMPLE I

Table 1 recites a portion comprising four lines of an export list logical volume. Each line includes a logical volume identifier, and a specified destination designator. In certain embodiments, logical volumes having the same destination are exported to a common set of stacked volumes. In certain embodiments, the destination designator comprises a 16 byte field. The export list of Table 1 includes four different logical volumes with a designated destination designator for each of those four logical volumes. For example, line 1 indicates that logical volume LOGCL1 is to be exported to a DISASTER destination. Such a destination may comprise, for example, a host computer/virtual tape system comprising a once-failed but now repaired/replaced information storage device/medium.

TABLE 1

| LINE | INSTRUCTION |
|---|---|
| 1 | LOGCL1,DISASTER |
| 2 | LOGCL2,DISASTER |
| 3 | LOGCL3,BACKUP |
| 4 | LOGCL4,BACKUP |

Line 2 indicates that logical volume LOGCL2 is to be exported to the DISASTER destination. Line 3 indicates that logical volume LOGCL3 is to be exported to a BACKUP destination. Line 4 indicates that logical volume LOGCL4 is to be exported to the BACKUP destination.

Referring again to FIG. 6, in step 615 Applicants' method writes an export physical volume comprising the logical volume to be exported, the identifier assigned to that logical volume, and the first storage attributes assigned to that logical volume. In certain embodiments, the export physical volume of step 615 includes a plurality of logical volumes to be exported, the identifiers assigned to each of those volumes, and the first storage attributes assigned to each of those volumes.

In step 620, the importing host forms an import list logical volume which includes the identifiers for one or more logical volumes to import. In certain embodiments, the import list logical volume of step 615 further indicates whether one or more of the second storage attributes of step 605 are to be assigned to the one or more imported logical volumes.

Examples II, III, and IV, are presented to further illustrate to persons skilled in the art how to make and use the invention and to identify certain embodiments thereof. These examples are not intended as limitations, however, upon the scope of the invention, which is defined only by the appended claims. Tables 2, 3, and 4, comprise four lines of an import list logical volume. In each of these import list logical volumes, the first line recites instructions to assign certain second storage attributes to all imported volumes. Lines 2, 3, and 4, however, recite exceptions to the global instructions of line 1.

More specifically, line 1 includes instructions to assign the storage group attribute "TAPESG1", and to assign the storage class attribute "SCLASS1", to all the imported logical volumes. Line 2 comprises an exception to the global instructions of Line 1. Line 2 instructs that logical volume LOGCL1, from stacked volume STDK01, be assigned the storage class attribute "TAPESG2." Line 3 instructs that logical volume LOGCL2, from stacked volume STDK02, be assigned the storage class attribute "TAPESGX." Line 4 instructs that all logical volumes from stacked volume STDK03 be assigned the management class attribute "COPY2."

EXAMPLE II

TABLE 2

| LINE | INSTRUCTION |
| --- | --- |
| 1 | OPTIONS1,FAILIMPORT,SG=TAPESG1,SC=SCLASS1 |
| 2 | STKD01,LOGCL1,,SG=TAPESG2 |
| 3 | STKD02,LOGCL2,,SG=TAPESGX |
| 4 | STKD03,,,MC=COPY2 |

The first portion of Line 1 of Table 2, namely the "OPTIONS 1, FAILIMPORT," portion, instructs that if one or more of the selected storage attributes assigned to an imported logical volume is undefined in the importing virtual tape system, then invoke a FAILIMPORT condition for that logical volume. In such a FAILIMPORT condition, the logical volume is not imported into the second virtual tape system. In certain embodiments, a message is provided to the importing host computer notifying the importing host that the logical volume cannot be imported.

EXAMPLE III

TABLE 3

| LINE | INSTRUCTION |
| --- | --- |
| 1 | OPTIONS1,USEDEFAULT,SG=TAPESG1,SC=SCLASS1 |
| 2 | STKD01,LOGCL1,,SG=TAPESG2 |
| 3 | STKD02,LOGCL2,,SG=TAPESGX |
| 4 | STKD03,,,MC=COPY2 |

The first portion of Line 1 of Table 3, namely the "OPTIONS 1, USEDEFAULT," portion, instructs that if one or more of the selected storage attributes for a logical volume is undefined in the importing virtual tape system, then replace those one or more undefined storage attributes with one or more default storage attributes. In certain embodiments, such default storage attributes comprise a blank field. Using this option, the logical volume is imported into the second virtual tape system and assigned one or more default storage attributes.

EXAMPLE IV

TABLE 4

| LINE | INSTRUCTION |
| --- | --- |
| 1 | OPTIONS1,CREATENAME,SG=TAPESG1,SC=SCLASS1 |
| 2 | STKD01,LOGCL1,,SG=TAPESSG2 |
| 3 | STKD02,LOGCL2,,SG=TAPESGX |
| 4 | STKD03,,,MC=COPY2 |

The first portion of Line 1 of Table 4, namely the "OPTIONS 1, CREATENAME," portion, instructs that if one or more of the selected storage attributes for a logical volume is undefined in the importing virtual tape system, then: (i) create those one or more undefined storage attributes, (ii) associate default storage actions to those one or more newly-created storage attributes, and (iii) and assign to that logical volume those one or more newly-created storage attributes. Using this option, the logical volume is imported into the second virtual tape system and is assigned the one or more newly created storage attributes.

In step 625, the export physical volume of step 610 is mounted in a data storage drive in communication with the importing host computer. In step 630, the importing host initiates import of the one or more logical volumes written to the import list logical volume of step 615. In certain embodiments, step 630 includes examining the export physical volume for specific identifiers.

In step 635, Applicants' method determines if the import list logical volume specifies use of second storage attributes. If Applicants' method determines in step 635 that the import list logical volume does not specify use of second storage attributes, then Applicants' method transitions from step 635 to step 640. Alternatively, if Applicants' method determines in step 635 that the import list logical volume does specify use of second storage attributes, then Applicants' method transitions from step 635 to step 645 wherein Applicants' method selects for the logical volume those one or more specified second storage attributes. Applicants' method transitions from step 645 to step 640.

In step 640, Applicants' method determines if the export physical volume includes first storage attributes assigned to the logical volume. If Applicants' method determines in step 640 that the export physical volume includes no first storage attributes assigned to the logical volume, then Applicants' method transitions from step 640 to step 660. Alternatively, if Applicants' method determines in step 640 that the export physical volume includes first storage attributes assigned to the logical volume, then Applicants' method transition from step 640 to step 650 wherein Applicants' method merges the second storage attributes selected in step 645 and the first, storage attributes from the export physical volume. By "merge," Applicants' mean to determine for each first storage attribute assigned to the logical volume, if a corresponding second storage attribute is specified in the import list logical volume. If such a conflict exists, the specified second storage attribute is selected.

If one or more first storage attributes were assigned the logical volume by the exporting virtual tape system, and no second storage attributes are specified by the importing host computer, then the merged storage attributes of 650 comprise the one or more first storage attributes are selected by the exporting virtual tape system. If no first storage attributes were assigned the logical volume by the exporting virtual tape system, and if one or more second storage attributes are specified by the importing host computer, then the merged storage attributes of 650 comprise the one or more specified second storage attributes. If one or more first storage attributes were assigned the logical volume by the exporting virtual tape system, and if one or more second storage attributes are specified by the importing host computer, then the merged storage attributes of 650 comprise the one or more specified second storage attributes and the one or more non-conflicting first storage attributes.

Applicants' method transitions from step 650 to step 660 wherein Applicants' method determines if the merged storage attributes of step 650 are defined in the importing virtual tape system. As described above, the logical volumes to be exported, and the assigned first storage attributes, are written to the export physical volume in step 615 at an export time. The export physical volume is mounted in step 625 at an import time. The time interval between the export time and the import time may be such that the assigned first storage attributes are no longer defined in the importing virtual tape system at import time.

In certain embodiments, the exporting virtual tape system is also the importing virtual tape system. In certain of these embodiments, the export list logical volume and the import list logical volume are both written at the export time. In certain of these embodiments, when the virtual tape system imports the logical volume at the import time one or more of the first storage attributes and one or more of the second storage attributes are no longer defined in the virtual tape system.

If Applicants' method determines in step 660 that the merged storage attributes are defined in the importing virtual tape system, then Applicants' method transitions from step 660 to step 665. Alternatively, if Applicants' method determines in step 660 that one or more of the merged storage attributes are not defined in the importing virtual tape system, then Applicants' method transitions from step 660 to step 710 (FIG. 7).

Figure 7:
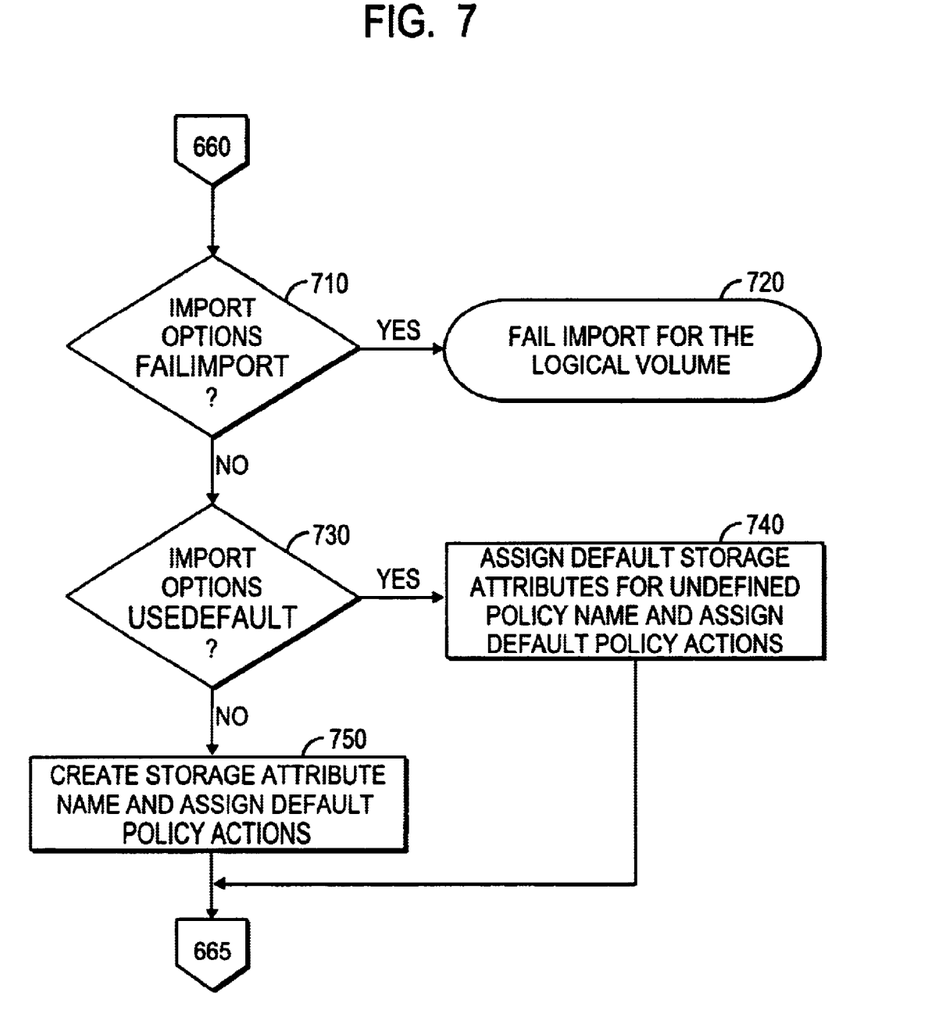
FIG. 7 is a flow chart summarizing additional steps in Applicants' method.

Referring now to FIG. 7, in step 710 Applicants' method determines if the import list logical volume specifies use of the FAILIMPORT option. If Applicants' method determines in step 710 that the import list logical volume specifies use of the FAILIMPORT option, then Applicants' method transitions from step 710 to step 720 wherein Applicants' method fails the import for the logical volume. In certain embodiments, step 720 further includes notifying the importing host computer that the logical volume cannot be imported into the importing virtual tape system.

Alternatively, if Applicants' method determines in step 710 that the import list logical volume does not specify use of the FAILIMPORT option, then Applicants' method transitions from step 710 to step 730 wherein Applicants' method determines if the import list logical volume specifies use of the USEDEFAULT option. If Applicants' method determines in step 730 that the import list logical volume specifies use of the USEDEFAULT option, then Applicants' method transitions from step 730 to step 740 wherein Applicants' method assigns default storage attributes for each of the undefined merged storage attribute, where those default storage attributes indicate use of default storage policy actions. Applicants' method transitions from step 740 to step 665 (FIG. 6).

Alternatively, if Applicants' method determines in step 730 that the import list logical volume does not specify use of the USEDEFAULT option, or if the import lost logical volume includes no import options, then Applicants' method transitions from step 730 to step 750 wherein Applicants' method creates the undefined merged storage attributes and assigns default storage attributes to those newly-created storage attributes. Applicants' method transitions from step 750 to step 665 (FIG. 6).

In step 665, Applicants' method imports the logical volume into the second virtual tape system and saves the merged storage attributes. As discussed above, those merged storage attributes may comprise first storage attributes, second storage attributes, or a combination thereof. In certain embodiments, the merged storage attributes are saved in a library manager disposed in the importing virtual tape system. In certain embodiments, the merged storage attributes are saved in a library inventory maintained in a library manager disposed in that importing virtual tape system.

In step 670, Applicants' method notifies the importing host computer that one or more logical volumes have been imported. In step 680, during entry processing the importing host computer requests the merged storage attributes. In step 690, Applicants' method provides to the tape management system disposed in the importing host computer the merged storage attributes to the imported logical volumes.

The embodiments of Applicants' method recited in FIGS. 5 and/or 6 may be implemented separately. For example, one embodiment may include only the steps of FIG. 5. Moreover, in certain embodiments, the individual steps recited in FIGS. 5 and/or 6 may be combined, eliminated, or reordered.

Applicants' invention includes an article of manufacture comprising a computer useable medium having computer readable program code disposed therein to export and then import a logical volume with assigned storage attributes. Applicants' invention further includes computer program products embodied as program code stored in one or more memory devices, such as a magnetic disk, a magnetic tape, or other non-volatile memory device, to export and then import a logical volume with assigned storage attributes.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to export and then import a logical volume with assigned storage attributes, comprising the steps of:

maintaining a logical volume in a first information storage medium;

assigning zero or more first storage attributes to said logical volume;

forming an import list logical volume;

defining a plurality second storage attributes;

importing said logical volume into a second information storage medium;

determining if said import list logical volume specifies use of one or more second storage attributes;

operative if said import list logical volume does not specify use of one or more second storage attributes, forming merged storage attributes comprising said zero or more first storage attributes;

operative if said import list logical volume specifies use of one or more second storage attributes, forming merged storage attributes comprising said one or more second storage attributes and zero or more non-conflicting first storage attributes; and saving said merged storage attributes.

2. The method of claim 1, further comprising the steps of:

providing a first host computer, wherein said first host computer assigns said first storage attributes;

providing a first virtual tape system capable of communicating with said first host computer, wherein said first virtual tape system comprises said first information storage medium and a first library inventory;

assigning by said first virtual tape system an identifier to said logical volume;

writing an export physical volume by said first virtual tape system comprising said logical volume, said identifier, and said zero or more first storage attributes;

providing a second virtual tape system, wherein said second virtual tape system comprises said second information storage medium and a second library inventory; and saving said merged storage attributes in said second library inventory.

3. The method of claim 2, wherein said first virtual tape system comprises said second virtual tape system.

4. The method of claim 2, further comprising the steps of:

defining by said first host computer a plurality of storage construct names;

assigning one or more of said plurality of storage construct names to said logical volume;

assigning each of said one or more storage construct names as a different one of said one or more first storage attributes.

5. The method of claim 2, further comprising the steps of:

determining if each of said storage attributes comprising said merged storage attributes is defined in said second virtual tape system;

operative if one or more of said merged storage attributes are not defined in said second virtual tape system, determining if said import list logical volume specifies a FAILIMPORT option;

operative if said import list logical volume specifies a FAILIMPORT option, failing the import of said logical volume.

6. The method of claim 5, further comprising the steps of:

providing a plurality of default storage attributes;

providing a plurality of default storage actions, wherein each of said default storage actions is associated with one or more default storage attributes;

determining if said import list logical volume specifies a USEDEFAULT option;

operative if said import list logical volume specifies a USEDEFAULT option, replacing in said merged storage attributes each undefined storage attribute with a default storage attribute.

7. The method of claim 6, further comprising the steps of:

determining if said import list logical volumes specifies a CREATENAME option;

operative if said import list logical volumes specifies a CREATENAME option, creating one or more new storage attributes, wherein each of said new storage attributes comprises the name of a different undefined merged storage attribute;

associating one or more of said default storage actions with each of said one or more newly-created storage attributes.

8. The method of claim 1, further comprising the step of notifying a second host that said logical volume has been imported.

9. The method of claim 8, wherein said second host computer comprises a tape management system, further comprising the steps of:

requesting said second virtual tape system provide to said second host said merged storage attributes; and providing said merged storage attributes to said tape management system.

10. A method to export and then import a logical volume with assigned storage attributes, comprising the steps of:

providing a first host computer;

providing a first virtual tape system capable of communicating with said first host computer, wherein said first virtual tape system comprises a first library inventory;

defining a plurality of storage construct names;

assigning one or more of said plurality of storage construct names to said logical volume;

assigning each of said one or more storage construct names as a different one of one or more first storage attributes;

assigning an identifier to said logical volume;

storing said one or more first storage attributes and said identifier in said first library inventory;

forming by said first host computer an export list logical volume comprising said identifier;

writing by said first virtual tape system an export physical volume comprising said logical volume, said identifier, and said one or more first storage attributes;

providing a second host computer;

providing a second virtual tape system comprising a second library inventory, wherein said second virtual tape system is capable of communication with said second host computer;

defining a plurality of second storage attributes;

forming by said second host computer an import list logical volume comprising said identifier;

importing said logical volume into said second virtual tape system;

determining if said import list logical volume specifies use of one or more second storage attributes;

operative if said import list logical volume does not specify use of one or more second storage attributes, forming merged storage attributes comprising said one or more first storage attributes;

operative if said import list logical volume specifies use of one or more second storage attributes, forming merged storage attributes comprising said one or more second storage attributes and zero or more non-conflicting first storage attributes;

saving said merged storage attributes in said second inventory;

notifying said second host that said logical volume has been imported;

requesting said second virtual tape system provide to said second host said merged storage attributes; and providing said merged storage attributes to said tape management system.

11. An article of manufacture comprising a computer useable medium having computer readable program code disposed therein to export and then import a logical volume with assigned storage attributes into a second virtual tape system, the computer readable program code comprising a series of computer readable program steps to effect:

maintaining a logical volume in a first information storage medium;

assigning zero or more first storage attributes to said logical volume;

forming an import list logical volume;

defining a plurality second storage attributes;

importing said logical volume into a second information storage medium;

determining if said import list logical volume specifies use of one or more second storage attributes;

operative if said import list logical volume does not specify use of one or more second storage attributes, forming merged storage attributes comprising said zero or more first storage attributes;

operative if said import list logical volume specifies use of one or more second storage attributes, forming merged storage attributes comprising said one or more second storage attributes and zero or more non-conflicting first storage attributes; and saving said merged storage attributes.

12. The article of manufacture of claim 11, said computer readable program code further comprising a series of computer readable program steps to effect:

assigning an identifier to said logical volume;

writing an export physical volume comprising said logical volume, said identifier, and said one or more first storage attributes.

13. The article of manufacture of claim 11, said computer readable program code further comprising a series of computer readable program steps to effect:

receiving one or more storage construct names assigned to said logical volume; and assigning each of said one or more storage construct names to said logical volume as a different one of said one or more first storage attributes.

14. The article of manufacture of claim 11, said computer readable program code further comprising a series of computer readable program steps to effect:

determining if each of said merged storage attributes assigned to a logical volume is defined in said second virtual tape system;

operative if one or more of said merged storage attributes assigned to a logical volume are not defined in said second virtual tape system, determining if said import list logical volume specifies a FAILIMPORT option;

operative if said import list logical volume specifies a FAILIMPORT option, failing the import of said logical volume.

15. The article of manufacture of claim 14, said computer readable program code further comprising a series of computer readable program steps to effect:

providing a plurality of default storage attributes;

providing a plurality of default storage actions, wherein each of said default storage actions is associated with one or more default storage attributes;

determining if said import list logical volume specifies a USEDEFAULT option;

operative if said import list logical volume specifies a USEDEFAULT option, replacing in said merged storage attributes each undefined storage attribute with a default storage attribute.

16. The article of manufacture of claim 15, said computer readable program code further comprising a series of computer readable program steps to effect:

determining if said import list logical volumes specifies a CREATENAME option;

operative if said import list logical volumes specifies a CREATENAME option, creating one or more new storage attributes, wherein each of said new storage attributes comprises the name of a different undefined merged storage attribute;

associating one or more of said default storage actions with said one or more newly-created storage attributes.

17. The article of manufacture of claim 11, said computer readable program code further comprising a series of computer readable program steps to effect notifying an importing host computer that said logical volume has been imported.

18. The article of manufacture of claim 17, wherein said importing host computer comprises a tape management system, said computer readable program code further comprising a series of computer readable program steps to effect:

receiving a request from said import host computer to provide said merged storage attributes; and providing said merged storage attributes to said tape management system.

19. An article of manufacture comprising a computer useable medium having computer readable program code disposed therein to export and then import a logical volume with assigned storage attributes, the computer readable program code comprising a series of computer readable program steps to effect:

providing a first host computer;

providing a first virtual tape system capable of communicating with said first host computer, wherein said first virtual tape system comprises a first library inventory;

defining a plurality of storage construct names;

assigning one or more of said plurality of storage construct names to said logical volume;

assigning each of said one or more storage construct names as a different one of one or more first storage attributes;

assigning an identifier to said logical volume;

storing said one or more first storage attributes and said identifier in said first library inventory;

forming by said first host computer an export list logical volume comprising said identifier;

writing by said first virtual tape system an export physical volume comprising said logical volume, said identifier, and said one or more first storage attributes;

providing a second host computer;

providing a second virtual tape system comprising a second library inventory, wherein said second virtual tape system is capable of communication with said second host computer;

defining a plurality of second storage attributes;

forming by said second host computer an import list logical volume comprising said identifier;

importing said logical volume into said second virtual tape system;

determining if said import list logical volume specifies use of one or more second storage attributes;

operative if said import list logical volume does not specify use of one or more second storage attributes, forming merged storage attributes comprising said one or more first storage attributes;

operative if said import list logical volume specifies use of one or more second storage attributes, forming merged storage attributes comprising said one or more second storage attributes and zero or more non-conflicting first storage attributes; and saving said merged storage attributes in said second inventory;

notifying said second host that said logical volume has been imported;

receiving a request to provide to said second host said merged storage attributes; and providing said merged storage attributes to said tape management system.

20. A computer program product usable with a programmable computer processor having computer readable program code embodied therein to export and then import a logical volume with assigned storage attributes into a second virtual tape system, comprising:

computer readable program code which causes said programmable computer processor to maintain a logical volume in a first information storage medium;

computer readable program code which causes said programmable computer processor to assign zero or more first storage attributes to said logical volume;

computer readable program code which causes said programmable computer processor to form an import list logical volume;

computer readable program code which causes said programmable computer processor to define a plurality second storage attributes;

computer readable program code which causes said programmable computer processor to import said logical volume into a second information storage medium;

computer readable program code which causes said programmable computer processor to determine if said import list logical volume specifies use of said second storage attributes;

computer readable program code which, if said import list logical volume does not specify use of said second storage attributes, causes said programmable computer processor to form merged storage attributes comprising said zero or more first storage attributes;

computer readable program code which, operative if said import list logical volume specifies use of one or more second storage attributes, causes said programmable computer processor to formed merged storage attributes comprising said one or more second storage attributes and zero or more non-conflicting first storage attributes; and computer readable program code which causes said programmable computer processor to save said merged storage attributes.

21. The computer program product of claim 20, further comprising:

computer readable program code which causes said programmable computer processor to assign an identifier to said logical volume;

computer readable program code which causes said programmable computer processor to write an export physical volume comprising said logical volume, said identifier, and said one or more first storage attributes.

22. The computer program product of claim 20, further comprising:

computer readable program code which causes said programmable computer processor to receive one or more storage construct names assigned to said logical volume;

computer readable program code which causes said programmable computer to assign each of said one or more storage construct names to said logical volume as a different one of said one or more first storage attributes.

23. The computer program product of claim 20, further comprising:

computer readable program code which causes said programmable computer processor to determine if each of said merged storage attributes is defined in said second virtual tape system;

computer readable program code which, if one or more of said merged storage attributes assigned to a logical volume are not defined in said second virtual tape system, causes said programmable computer processor to determine if said import list logical volume specifies a FAILIMPORT option;

computer readable program code which, if said import list logical volume specifies a FAILIMPORT option, causes said programmable computer processor to fail the import of said logical volume.

24. The computer program product of claim 20, further comprising:

computer readable program code which causes said programmable computer processor to determine if said import list logical volume specifies a USEDEFAULT option;

computer readable program code which, if said import list logical volume specifies a USEDEFAULT option, causes said programmable computer processor to replace in said merged storage attributes each undefined storage attribute with a provided default storage attribute.

25. The computer program product of claim 24, further comprising:

computer readable program code which causes said programmable computer processor to determine if said import list logical volumes specifies a CREATENAME option;

computer readable program code which, if said import list logical volumes specifies a CREATENAME option, causes said programmable computer processor to create one or more new storage attributes, wherein each of said new storage attributes comprises the name of a different undefined merged storage attribute.

26. The computer program product of claim 20, further comprising computer readable program code which causes said programmable computer processor to notify an importing host computer that said logical volume has been imported.

27. The computer program product of claim 26, wherein said importing host computer comprises a tape management system, further comprising:

computer readable program code which causes said programmable computer processor to receive a request to provide to said importing host computer said merged storage attributes; and computer readable program code which causes said programmable computer processor to provide to said importing host computer said merged storage attributes.

28. A computer program product usable with a programmable computer processor having computer readable program code embodied therein to export and then import a logical volume with assigned storage attributes, comprising:

computer readable program code which causes said programmable computer processor to maintain a logical volume on a first information storage medium;

computer readable program code which causes said programmable computer processor to receive one or more storage construct names assigned to said logical volume;

computer readable program code which causes said programmable computer processor to assign each of said one or more storage construct names as a different one of one or more storage attributes assigned to said logical volume;

computer readable program code which causes said programmable computer processor to assign an identifier to said logical volume;

computer readable program code which causes said programmable computer processor to form an export list logical volume comprising said identifier;

computer readable program code which causes said programmable computer processor to write an export physical volume comprising said logical volume, said identifier, and said one or more first storage attributes;

computer readable program code which causes said programmable computer processor to define a plurality of second storage attributes;

computer readable program code which causes said programmable computer processor to form an import list logical volume comprising said identifier;

computer readable program code which causes said programmable computer processor to import said logical volume;

computer readable program code which, if said import list logical volume does not specify use of said second storage attributes, causes said programmable computer processor to form merged storage attributes comprising said one or more first storage attributes;

computer readable program code which, operative if said import list logical volume specifies use of one or more second storage attributes, causes said programmable computer processor to formed merged storage attributes comprising said one or more second storage attributes and zero or more non-conflicting first storage attributes;

computer readable program code which causes said programmable computer processor to save said merged storage attributes;

computer readable program code which causes said programmable computer processor to receive a request to provide to an importing computer said merged storage attributes; and computer readable program code which causes said programmable computer processor to provide said merged storage attributes to a tape management system disposed in said importing host computer.

* * * * *